United States Patent
Montagna et al.

(10) Patent No.: US 7,086,680 B2
(45) Date of Patent: Aug. 8, 2006

(54) BED LINER HAVING ENHANCED FRICTIONAL CHARACTERISTICS

(75) Inventors: John C. Montagna, Metamora, MI (US); Gary J. Nehring, Linden, MI (US); Donald J. LaBelle, Macomb Township, MI (US)

(73) Assignee: Durakon Industries, Inc., Lapeer, MI (US)

( * ) Notice: Subject to any disclaimer, the term of this patent is extended or adjusted under 35 U.S.C. 154(b) by 0 days.

(21) Appl. No.: 10/773,711

(22) Filed: Feb. 6, 2004

(65) Prior Publication Data

US 2004/0262951 A1 Dec. 30, 2004

Related U.S. Application Data

(63) Continuation-in-part of application No. 10/290,676, filed on Nov. 8, 2002, now Pat. No. 6,848,733.

(51) Int. Cl.
*B60R 13/01* (2006.01)

(52) U.S. Cl. ...................................................... 296/39.2

(58) Field of Classification Search ............... 296/39.1, 296/39.2
See application file for complete search history.

(56) References Cited

U.S. PATENT DOCUMENTS

| | | |
|---|---|---|
| 1,438,231 A | 12/1922 | Goodenberger |
| 2,191,106 A | 2/1940 | Denison et al. |
| 2,791,463 A | 5/1957 | Levitt |
| 2,849,752 A | 9/1958 | Leary |
| 2,951,305 A | 9/1960 | Seymour |
| 3,030,251 A * | 4/1962 | La Bore et al. ............ 428/40.1 |
| 3,399,425 A | 9/1968 | Lemelson |
| 3,825,141 A | 7/1974 | Campagna |
| 3,895,153 A * | 7/1975 | Johnston et al. ............ 428/141 |
| 4,151,320 A | 4/1979 | Naka |
| 4,336,293 A * | 6/1982 | Eiden ........................ 428/143 |
| 4,341,412 A | 7/1982 | Wayne |
| 4,486,371 A | 12/1984 | Caliri |
| 4,630,407 A | 12/1986 | Rhodes |
| 4,676,938 A | 6/1987 | Karklin et al. |
| 4,693,507 A * | 9/1987 | Dresen et al. ............. 296/39.2 |
| 4,769,106 A | 9/1988 | Busching |
| 4,984,673 A * | 1/1991 | Saito et al. ................ 198/333 |
| 5,007,670 A | 4/1991 | Wise |
| 5,046,434 A | 9/1991 | Breezer et al. |
| 5,084,521 A | 1/1992 | White |

(Continued)

FOREIGN PATENT DOCUMENTS

EP 0 601 076 B1 10/1996

*Primary Examiner*—H Gutman
(74) *Attorney, Agent, or Firm*—Flaster/Greenberg P.C.

(57) ABSTRACT

A motor vehicle bed or bed liner is vacuum formed from a single layer or two layer panel of thermoplastic material having a scuffed or roughened surface. The single layer panel is typically extruded and is homogeneous, being either a single material such as HDPE or a uniform mixture of materials. The two layer panel is co-formed of two layers of material which will typically be distinct compositions and characteristics. The upper surface of the panel is scuffed or roughened by a brush which contacts the surface. A bank of individually adjustable rollers supports the panel during the roughening operation and facilitates adjustment of the extent of contact or impingement of the brush on the surface of the panel at a plurality of transverse locations across the panel. The roughened panel is then vacuum formed into, for example, a truck bed or bed or cargo compartment liner.

9 Claims, 6 Drawing Sheets

U.S. PATENT DOCUMENTS

| | | |
|---|---|---|
| 5,090,287 A | 2/1992 | Chezem |
| 5,167,969 A | 12/1992 | DeMaio, Jr. et al. |
| 5,322,335 A | 6/1994 | Niemi |
| 5,460,883 A | 10/1995 | Barber, Jr. et al. |
| 5,474,829 A | 12/1995 | Woosley |
| 5,549,428 A | 8/1996 | Yeatts |
| 5,597,194 A | 1/1997 | Daugherty et al. |
| 5,616,411 A | 4/1997 | Barber, Jr. et al. |
| 5,648,031 A | 7/1997 | Sturtevant et al. |
| 5,658,523 A | 8/1997 | Shuert |
| 5,720,999 A | 2/1998 | Lanzani et al. |
| 5,737,794 A | 4/1998 | Barber, Jr. et al. |
| 5,806,909 A | 9/1998 | Wise |
| 5,858,508 A * | 1/1999 | Sturtevant et al. .......... 428/147 |
| 5,887,931 A | 3/1999 | Bills et al. |
| 5,899,519 A * | 5/1999 | Doshi ........................ 296/39.2 |
| 5,983,434 A | 11/1999 | Eichinger et al. |
| 5,988,723 A | 11/1999 | Adkins |
| 6,017,075 A | 1/2000 | Emery et al. |
| 6,024,396 A * | 2/2000 | Doshi ........................ 296/39.2 |
| 6,048,017 A * | 4/2000 | Doshi ........................ 296/39.2 |
| 6,076,879 A | 6/2000 | Bills et al. |
| 6,086,354 A | 7/2000 | Dresen et al. |
| 6,095,787 A | 8/2000 | Bills, Sr. |
| 6,129,402 A | 10/2000 | Carriere |
| 6,176,537 B1 * | 1/2001 | Doshi ........................ 296/39.2 |
| 6,200,122 B1 | 3/2001 | Chun et al. |
| 6,237,980 B1 * | 5/2001 | Miles et al. ................ 296/39.2 |
| 6,245,694 B1 | 6/2001 | Davenport et al. |
| 6,294,114 B1 | 9/2001 | Muirhead |
| 6,303,197 B1 | 10/2001 | Hodgetts |
| 6,431,629 B1 * | 8/2002 | Emery ........................ 296/39.2 |
| 6,509,084 B1 * | 1/2003 | Sturtevant et al. .......... 428/141 |
| 6,521,154 B1 | 2/2003 | Bills, Sr. |
| 6,524,681 B1 * | 2/2003 | Seitz et al. .................. 428/143 |
| 6,604,778 B1 * | 8/2003 | Doshi ........................ 296/181.3 |
| 2001/0035661 A1 | 11/2001 | Doshi |
| 2002/0140247 A1 | 10/2002 | Emery |

* cited by examiner

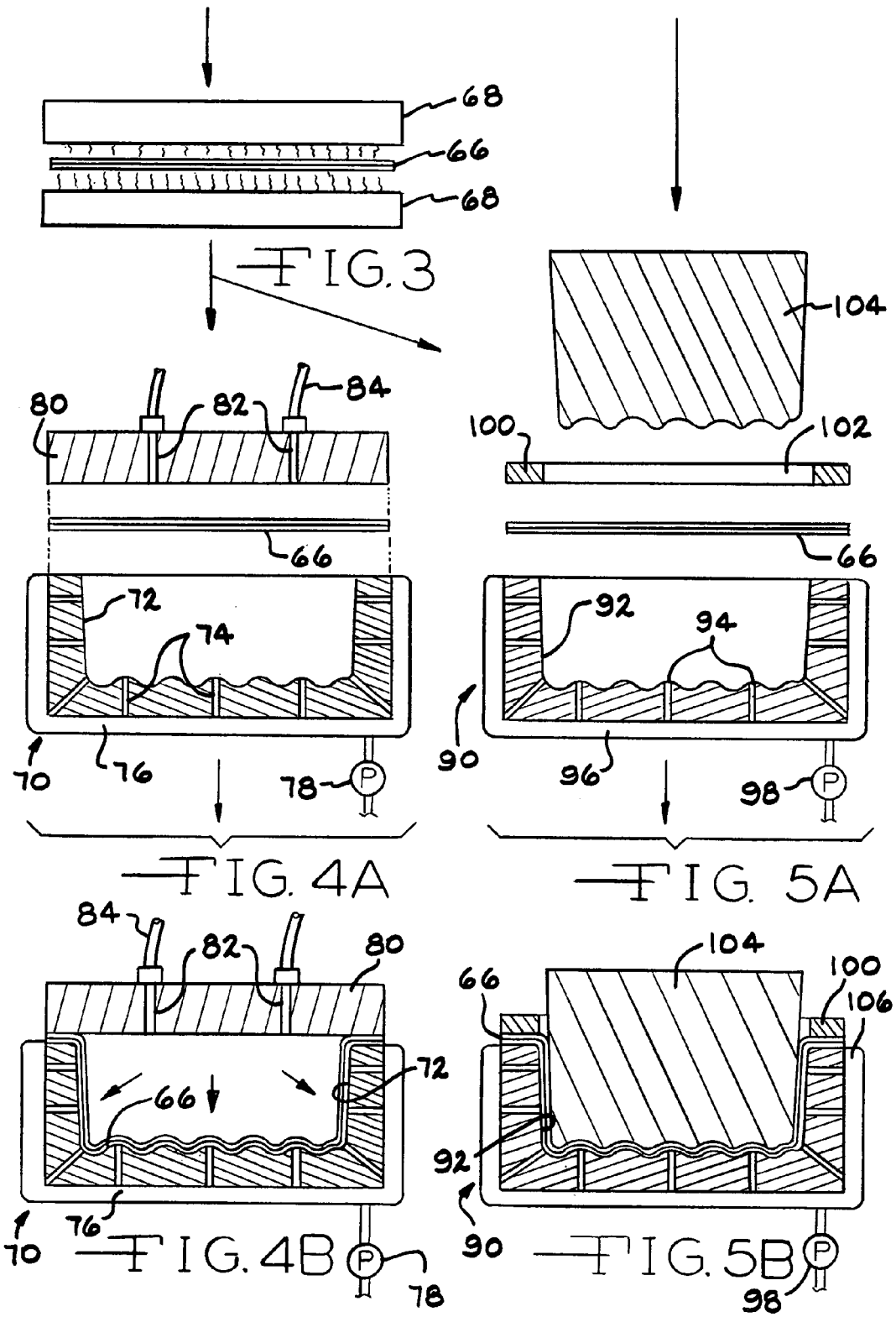

BED LINER HAVING ENHANCED FRICTIONAL CHARACTERISTICS

This patent application is a continuation-in-part application of patent application Ser. No. 10/290,676, filed Nov. 8, 2002, now U.S. Pat. No. 6,848,733 B2.

BACKGROUND OF THE INVENTION

The invention relates generally to beds and bed liners for motor vehicles and more particularly to beds and bed liners fabricated of a single layer or two layer panel having a roughened, friction enhancing surface.

Liners for motor vehicle cargo compartments, particularly liners for SUV's and cargo vans, and bed liners for pickup trucks provide many benefits. First of all, such bed liners provide a resilient barrier between the cargo area and the actual truck bed or vehicle which absorbs energy and reduces denting and damage to the bed when heavy loads are transported. Furthermore, such liners protect the vehicle bed or interior from water, dirt, salt and any other material which might damage or deteriorate the protected region of the vehicle.

One drawback that accompanies components such as beds and bed liners which are typically made from thermoplastic or other organic materials is the relatively low coefficient of friction exhibited by their load supporting surfaces. This low coefficient of friction manifests itself as spontaneous repositioning of cargo during abrupt maneuvers such as rapid cornering. Frequently, their coefficient of friction will be lower than that of the unprotected vehicle bed or cargo compartment floor.

Accordingly, it would be desirable for a bed or liner product to exhibit both the protective features of a bed or cargo compartment liner while providing a cargo contacting surface which exhibits a coefficient of friction greater than that of conventional bed or bed liner surfaces.

SUMMARY OF THE INVENTION

A motor vehicle bed or bed liner is vacuum formed from a single layer or two layer panel of thermoplastic material having a scuffed or roughened surface. The single layer panel is typically extruded and is homogeneous, being either a single material such as HDPE or a uniform mixture of materials. The two layer panel is co-formed of two layers of material which will typically be distinct compositions and characteristics. The upper surface of the panel is scuffed or roughened by a brush which contacts the surface. A bank of individually adjustable rollers supports the panel during the roughening operation and facilitates adjustment of the extent of contact or impingement of the brush on the surface of the panel at a plurality of transverse locations across the panel. The roughened panel is then vacuum formed into, for example, a truck bed or bed or cargo compartment liner. The present invention comprehends the apparatus, the method of fabrication and the resulting product.

Thus it is an object of the present invention to provide a motor vehicle bed or bed liner having enhanced frictional characteristics.

It is a further object of the present invention to provide an apparatus for forming a one or two layer panel and for scuffing or roughening one surface thereof to enhance its frictional characteristics.

It is a still further object of the present invention to provide a motor vehicle bed or bed liner formed from a single or two layer panel of thermoplastic material having a variably roughened surface.

It is a still further object of the present invention to provide a motor vehicle bed or bed liner which is vacuum formed from a single or two layer panel of thermoplastic material having a variably roughened surface.

It is a still further object of the present invention to provide a method of fabricating a motor vehicle bed or bed liner from a co-formed panel of thermoplastic materials having a variably roughened surface.

It is a still further object of the present invention to provide a method of fabricating a motor vehicle bed or bed liner by vacuum forming a single or two layer panel of thermoplastic materials having a variably roughened surface.

Further objects and advantages of the present invention will become apparent by reference to the following description of the preferred embodiment and appended drawings wherein like reference numbers refer to the same component, element of feature.

BRIEF DESCRIPTION OF THE DRAWINGS

FIG. 3 is an optional heating step for raising the temperature of the thermoplastic sheet or panel prior to thermoforming;

FIGS. 4A and 4B schematically illustrated the thermoforming of a bed or bed liner from a thermoplastic sheet within a mold by the application of vacuum to one side of the sheet and pressure to the other;

FIGS. 5A and 5B schematically illustrate the thermoforming of a bed or bed liner from a thermoplastic sheet within an outer vacuum mold and a movable forming insert;

DETAILED DESCRIPTION OF THE INVENTION

Figure 1:
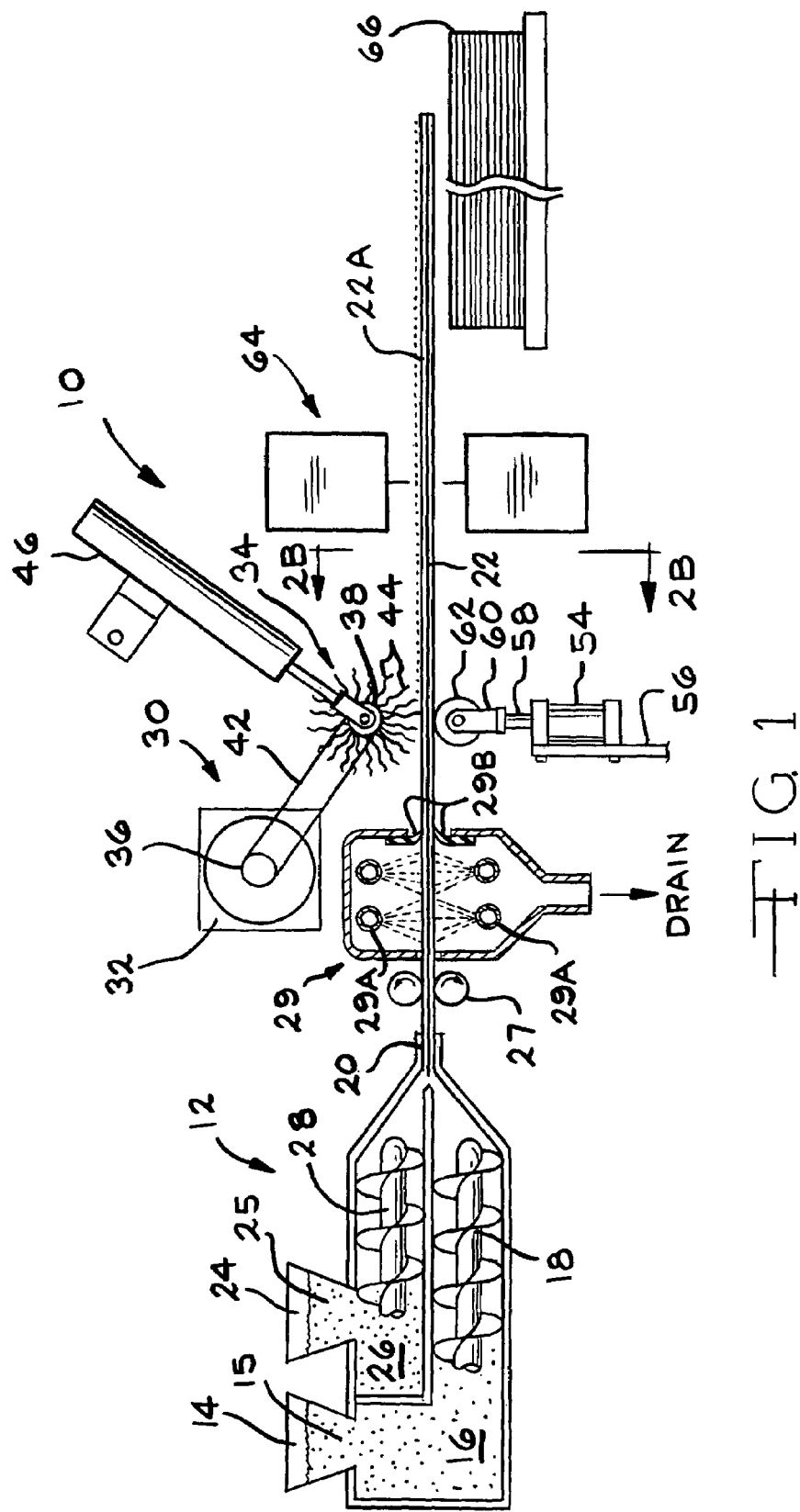
FIG. 1 schematically illustrates a manufacturing process for forming a single layer panel or sheet by extrusion or co-forming by co-extrusion a composite, two layer panel or sheet having a roughened upper surface.

Referring now to FIG. 1, an apparatus for forming a single or two layer sheet or panel and scuffing, roughening or abrading its upper surface is illustrated and generally designated by the reference number 10. The apparatus 10 includes an extruding machine 12 having a first hopper 14 which may be filled with, for example, a first, preferably pelletized thermoplastic material 15, which is provided to a first interior, heated region 16 of the machine 12 having a first auger assembly 18 which forces the heated thermoplastic material 15 into a lower portion of a horizontally elongate extrusion nozzle 20. The first thermoplastic material 15 typically functions as the lower layer or substrate of a co-formed, (two layer or composite) extruded material or extrudate 22 or finished product and is therefore preferably selected from thermoplastics having good ruggedness and temperature stability such as high density polyethylene (HDPE) and similar materials.

Again, if the extrudate 22 or finished product will include two layers, the machine 12 also includes a second hopper 24 which provides a second, preferably pelletized thermoplastic material 25 into a second interior, heated region 26 of the machine 12 having a second auger assembly 28 which provides the second melted thermoplastic material 25 to an upper portion of the extrusion nozzle 20. The second thermoplastic material 25 becomes the upper layer of the co-formed extrudate 22 or finished product and is therefore preferably selected from softer thermoplastics having relatively higher coefficients of friction and which are amenable to surface treatment such as scuffing or abrading. Materials such as low density polyethylene (LDPE), linear low density polyethylene (LLDPE), polypropylene, and other polyolefins have been found suitable.

On the other hand, if the extrudate 22 and finished product require and therefore include but a single layer, either the extruding machine 12 may be supplied with the same material in the first and the second hoppers 14 and 24 such that the resulting extruded material or extrudate 22 is homogeneous, or only one portion of the extruding machine 12 i.e., one of the hoppers 14 and 24, one of the heated region 16 and 28 and one of the auger assemblies 16 or 26 may be utilized and appropriate adjustments, if necessary, may be made to the machine 12 and the extrusion nozzle 20 so that it, in effect, operates as a conventional, single material, single flow extruding machine. It will be appreciated that a dedicated single material, single flow extruding machine may also be utilized to produce the single layer extruded material or extrudate 22.

The extruded material or extrudate 22 is then engaged by one or more pairs of vertically aligned, horizontally extending, contra-rotating rollers 27 which compress and size the extruded material or extrudate 22 as well as assist its uniform withdrawal from the extrusion nozzle 20 and translation therefrom. The rollers 27, particularly if they are utilized in multiple pairs, also assist the stabilization of the extruded material 22 through cooling.

Adjacent and downstream of the rollers 27 is a shrouded water cooling station 29 having upper and lower water spray head assemblies 29A which provide cooling water to both surfaces of the extruded material 22. Upper and lower squeegees 29B remove water from the respective surfaces of the extruded material 22 with the shroud and it is collected in a drain. If desired, additional drying features such as forced air or heated forced air dryers or vacuum chambers (both not illustrated) adjacent the surface of the extruded material 22 just downstream of the shrouded water cooling station 29 may be utilized to further dry the upper surface or both surfaces of the extruded material 22.

Adjacent and downstream the water cooling station 29 is an assembly 30 for providing a scuffed, roughened or textured upper surface to the extruded material 22. The assembly 30 includes a prime mover, such as an electric motor 32 which is coupled to a circular, elongate brush assembly 34 by a pair of pulleys 36 and 38, one of which is disposed upon an output shaft to the motor 32 and the other of which is disposed upon one end of the circular, elongate brush assembly 34 and a belt 42. The circular, elongate brush assembly 34 includes a plurality of radially extending, relatively stiff brush elements or bristles 44. The bristles 44 are preferably metal but other less rigid materials may be utilized if the lengths of the bristles 44 are reduced and/or the sizes, i.e., diameters, of the bristles 44 are increased.

The brush assembly 34 is disposed above and, in operation, in contact with the upper surface of the extruded material 22. Preferably, the brush assembly 34 rotates in a direction such that at the region of contact between the brush assembly 34 and the upper surface of the extruded material 22, the tips of the bristles 44 are traveling in a direction opposite that of the extruded material 22. Furthermore, there is a significant difference between the surface (linear) speed of the extruded material 22 and the surface (circumferential) speed of the tips of the bristles 44 of the brush assembly 34. For example, a typical linear speed for the extruded material 22 is between 2 and 7 feet per minute (0.61 meter per min. to 2.13 meters per min.). The brush assembly 34 defines a typical diameter of 1 foot (0.3 meter) and rotates at a nominal speed of 1700 r.p.m. The circumferential surface speed of the tips of the bristles 44 will therefore be approximately 5340 feet per minute (1628 meters/min.). Circumferential surface (tip) speeds in the range of 3,000 to 6,000 feet per minute (914 meters per min. to 1829 meters per min.) have been found satisfactory.

Figure 2A:
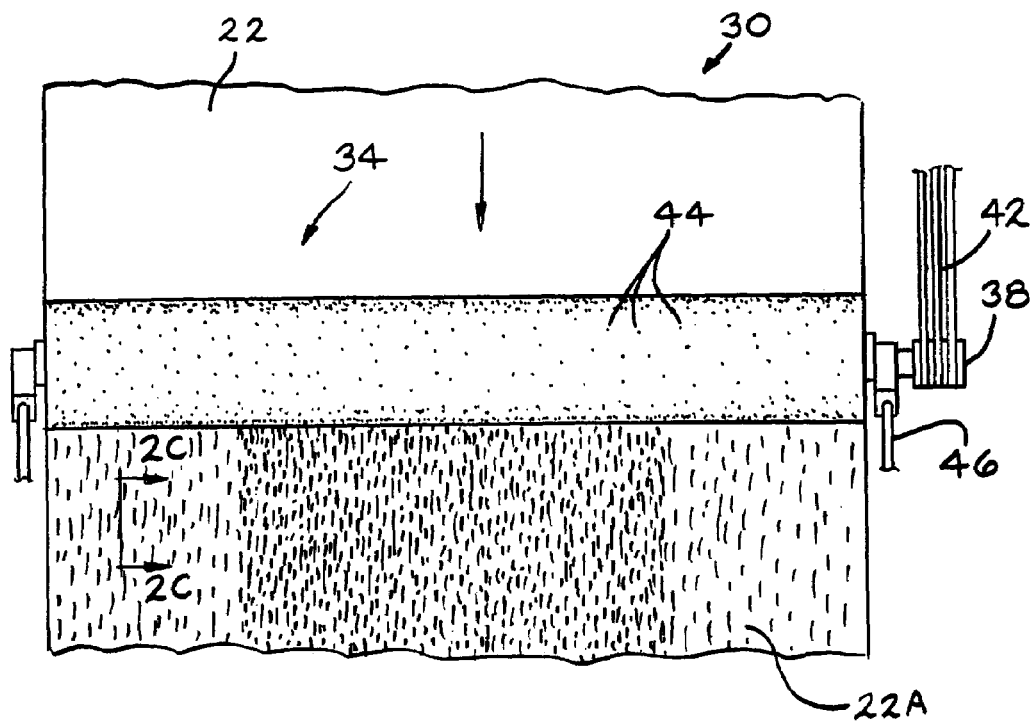
FIG. 2A illustrates scuffing or roughening of the full width of the upper surface of the thermoplastic sheet with less scuffing or roughening occurring near the edges of the sheet and more, i.e., greater or deeper scuffing or roughening, occurring near the middle of the sheet.

The extent or degree of contact (impingement) of the bristles 44 on or against the upper surface of the extruded material 22 may be coarsely adjusted by a bi-directional linear translation device 46 which is preferably a pair of electrically operated lead screws or pneumatic or hydraulic servo-controlled piston and cylinder assemblies. As illustrated in FIGS. 2A and 2C, the bristles 44 abrade or scuff, score or roughen the upper surface of the extruded material 22 and create a plurality of generally shallow, irregular, arcuate aligned grooves or elongate depressions 48.

Figure 2B:
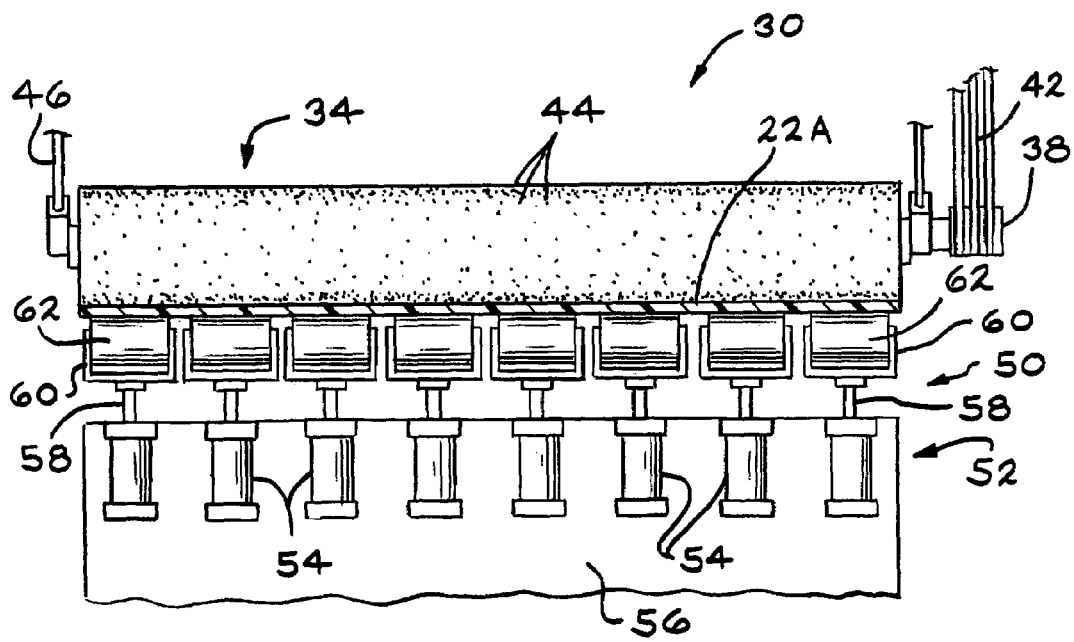
FIG. 2B is a full sectional view of an adjustment assembly according to the present invention taken along line 2B—2B of FIG. 1.
Figure 2C:
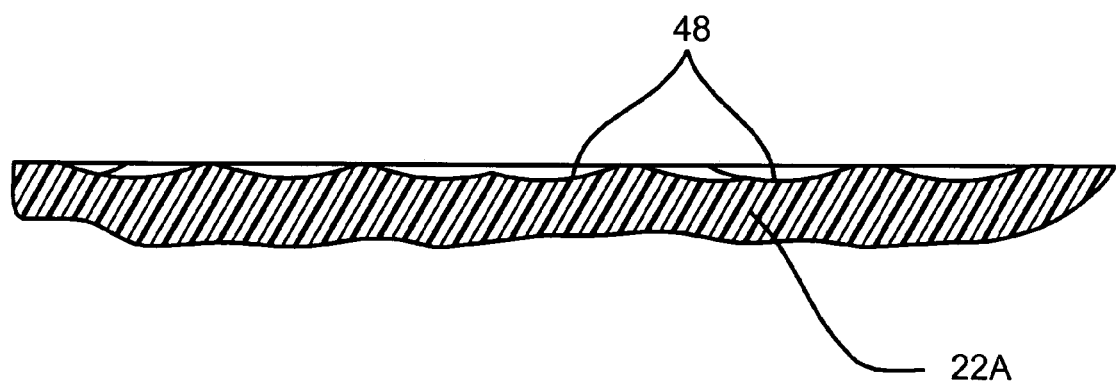
FIG. 2C is an enlarged, fragmentary, sectional view of an abraded or scuffed surface according to the present invention taken along line 2C—2C of FIG. 2A.

Referring now to FIGS. 2A and 2B, the extent or degree of contact (impingement) of the bristles 44 on or against the upper surface of the extruded material 22 may also be adjusted at a plurality of transverse sections or regions by a contact adjusting assembly 50. The contact adjusting assembly 50 includes a plurality of bi-directional linear translation mechanisms 52 which preferably each include an electrically operated lead screw or servo-controlled hydraulic or pneumatic cylinder 54. Other bi-directional linear translation mechanisms which are capable of positioning an output member at a desired position are also suitable. Each of the lead screw assemblies or cylinders 54 are secured to a mounting or support plate 56. Each of the lead screw assemblies or cylinders 54 includes a bi-directionally translating output shaft 58 which is secured to a clevis 60 which locates and supports a freely rotatable horizontally disposed roller 62. Typically, eight of the linear translating mechanisms 52 and the rollers 62 will be utilized: two outer pairs defining a width approximately equal to the height of each sidewall of a truck bed or liner and an inner group of four rollers 62 having a width approximately equal to the width of the bottom panel of a bed or bed liner. It will be appreciated that a larger number of narrower rollers 62 and associated drive means or a smaller number of wider rollers 62 and associated drive means may readily be utilized in this invention. For example, the outer pairs of rollers 62 may each be replaced with a single wider roller 62 and the four center rollers may be replaced with one or two rollers 62 having correspondingly greater widths.

The bristles 44 of the brush assembly 34 score, abrade or roughen the surface of the extruded material 22 and create a plurality of irregular, generally aligned, arcuate depressions. This irregular, roughened surface of the extruded material 22A provides enhanced frictional characteristics thereby reducing the sliding and movement of loads placed upon the extruded, roughened surface material 22A when it is utilized as a van liner, truck bed, truck bed liner or other, similar load bearing product.

The incorporation and use of a plurality of the mechanisms 52 and the rollers 62 allows adjustment of the extent or depth of impingement of the brush bristles 44 on the extruded material 22 at regions across the material 22. For example, the outer regions of the extruded material 22 corresponding to the sidewalls of a bed liner may undergo only a relatively small amount of abrasion because the rollers 62 are lowered somewhat and the center region may be significantly scuffed or abraded because these rollers 62 are raised relative to the outside rollers 62. All of the rollers 62 may be raised to compensate for wear of the brush assembly 34 or thinner material 22 or lowered to compensate for thicker material 22 or the installation of a new brush assembly 34 with longer bristles 44.

Referring now to FIGS. 1 and 2B, the bi-directional linear translation device 46, in addition to coarsely adjusting the extent of impingement between the bristles 44 on the upper surface of the extruded material 22 may also be operated to raise the brush assembly 34 entirely out of contact with the upper surface of the extruded material 22 in a cyclic fashion such that, for example, the roughened surface 22A will correspond to or cover only the bottom panel of a finished bed or bed liner and not extend along (up) the front panel. Thus, the bi-directional linear translation device 46 may be cyclically raised so that the brush assembly 34 is out of contact with the extruded material 22 as that portion of the extruded material 22 corresponding to the front panel of a finished bed or bed liner passes underneath. The brush assembly 34 may then be lowered back into contact with the extruded material 22 as a next length of the extruded material 22 corresponding to the length of the bottom panel or portion of a bed or bed liner passes under the brush assembly 34. In this manner, only that portion of the extruded material 22 corresponding to the bottom panel of a finished bed liner will be roughened while that portion corresponding to the front panel will exhibit the relatively smooth finish provided by the nozzle 20 of the extruding machine 12 and the pair of rollers 24, as noted above. It should also be appreciated that the brush assembly 34 may be fixed and that all movement and adjustment of both the extent of engagement across the extruded material 22 and of a cyclic nature can be achieved by moving the rollers 62.

The extruded material 22A having a roughened upper surface is provided to a cutter or cutting assembly 64 which cuts the extruded and surface roughened material 22A into sheets or panels 66 of a desired length which may then be utilized to form van or truck bed liners, truck beds or similar products.

FIG. 3 schematically illustrates a heating step where the temperature of the sheets or panels 66 may be elevated preparatory to thermoforming. A pair of horizontal, parallel and spaced apart heaters 68 which may include forced air or radiant heating assemblies supplied with, for example, gas or electricity, receive a sheet or panel 66 for a sufficient period of time to raise it to an elevated temperature, as noted above, several hundred degrees Fahrenheit. When the sheet or panel 66 has been raised to a sufficient temperature, it may be thermoformed by one of the two processes described below or another comparable or analogous thermoforming process. It should be understood, however, that if one of the following thermoforming processes are carried out immediately or directly after the sheets or panels 66 are produced, it may be possible to dispense with the heating step illustrated in FIG. 3.

Turning then to FIGS. 4A and 4B, a vacuum and pressure forming process is illustrated. The process utilizes a vacuum die or mold assembly 70 having an interior or female mold surface 72 which precisely reproduces the desired outer form and configuration of a product such as a truck bed or bed liner. The mold surface 72 includes a plurality of vacuum passageways 74 which lead from the mold surface 72 to a vacuum plenum 76. The vacuum plenum 76 surrounds the mold assembly 70 and is in communication with a vacuum pump 78 which draws a partial vacuum in the plenum 76 and draws air through the vacuum ports 74. A sheet or panel 66 at an elevated temperature is placed upon the mold assembly 70 and a mold plate or cover 80 having a size which is coextensive with the size of the mold assembly 70 is positioned on top of the sheet or panel 66 which is positioned on top of the mold assembly 70. Pressurized air is provided to a plurality of pressure ports 82 in the mold plate or cover 80 through a plurality of flexible hoses 84. The vacuum pump 78 is activated and a vacuum is drawn on the lower surface of the sheet or panel 66 and air pressure is applied to the upper surface of the sheet or panel 66. The vacuum drawn on the lower surface of the sheet or panel 66 and the air pressure on the upper surface of the sheet or panel 66 forms it into intimate contact with the mold surface 72 as illustrated in FIG. 4B.

Referring now to FIGS. 5A and 5B, an alternate thermoforming process is illustrated. As an alternative to forming a product such as a bed or bed liner through vacuum and pressure forming as illustrated in FIGS. 4A and 4B, a product may be formed through the use of male and female mold segments which are either fixed or, particularly in the case of the male mold segment, may include moveable corner sections or other moveable features such as bladders which may facilitate separation of the molds segments and/or improve the uniform distribution of material within the mold and in the finished product.

FIGS. 5A and 5B schematically present such a process. This process utilizes a conventional female mold assembly 90 having an interior surface 92 which corresponds to the exterior size and configuration of the final molded product. The mold assembly 90 includes a plurality of through passageways 94 which communicate between the interior mold surface 92 and a vacuum plenum 96 which surrounds the mold assembly 90. The plenum 96 is in communication with a vacuum pump 98 which, according to conventional practice, draws a distributed vacuum over the interior surface 92 of the mold assembly 90.

The alternate thermoforming process utilizes the sheet or panel 66 which is placed above the mold assembly 90 and beneath a clamping frame 100 which engages the sheet or panel 66 about a region adjacent its peripheral edge and clamps the sheet or panel 66 to the mold so that it is stretched during the molding process. The clamping frame 100 includes a large open region 102 through which a male mold segment or plug 104 is vertically translatable. The male mold segment or plug 104 may include moveable mold components such as corner sections or plugs (not illustrated) which may be either a fixed configuration and bi-directionally translatable or may be inflatable bladders to appropriately engage and translate portions of the sheet or panel 66 into intimate contact with the various panels and features defined by the interior surface 92 of the mold assembly 100.

As illustrated in FIG. 5B, the frame 100 is lowered into intimate contact with the upper surface of the sheet or panel 66 and the male mold segment or plug 104 is lowered into the mold cavity of the mold assembly 90. The vacuum pump 98 is activated, thereby drawing the sheet or panel 66 into intimate contact with the interior surface 92 of the mold assembly 90 thereby forming the sheet or panel 66 into the desired final shape of the product.

Figure 6:
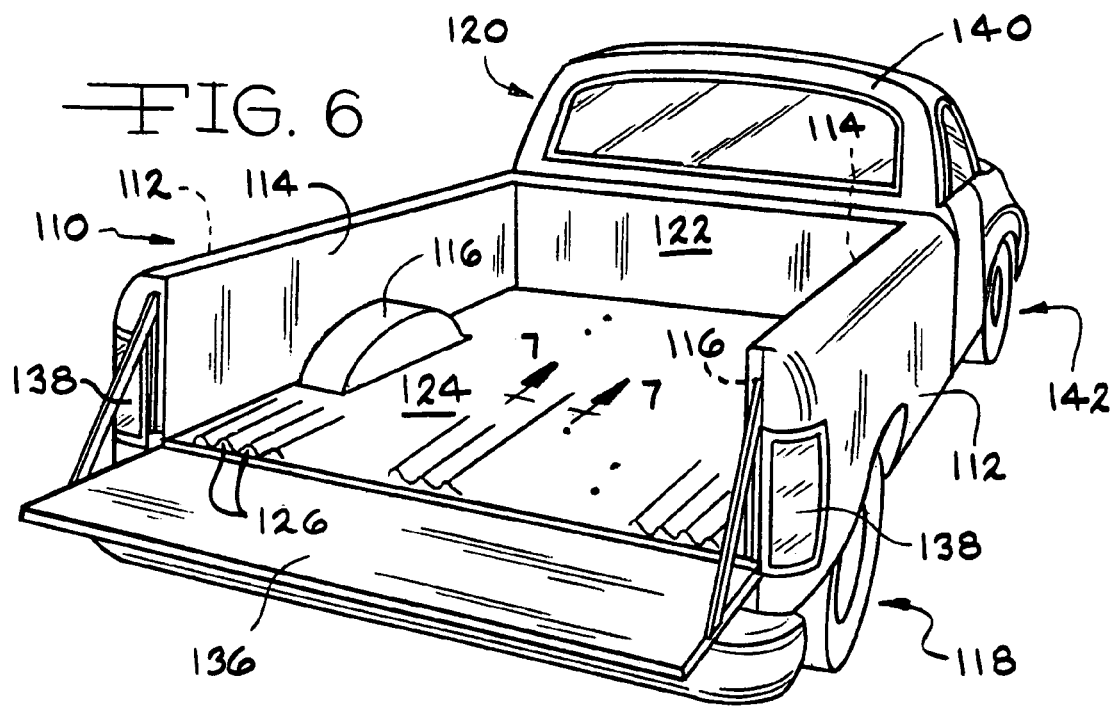
FIG. 6 is perspective view of a pickup truck having a non-metallic box or bed according to the present invention.
Figure 7:
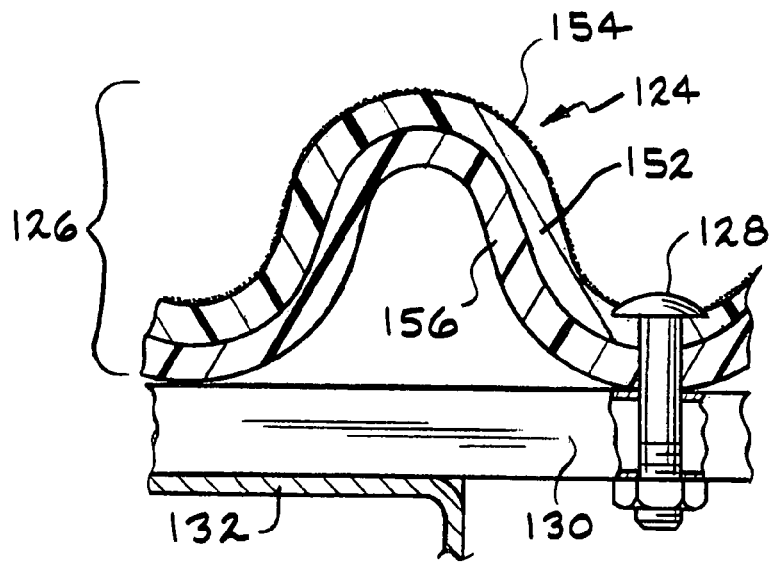
FIG. 7 is a greatly enlarged, fragmentary, sectional view of a truck bed taken along line 7—7 of FIG. 6.

Referring now to FIGS. 6 and 7, a non-metallic pickup truck bed manufactured according to the present invention is illustrated and designated by the reference number 110. The non-metallic pickup truck bed 110 is a unitary structure molded from a single or two layer panel or sheet of the engineered thermoplastics described above such as high density polyethylene (HDPE), low density polyethylene (LDPE), polypropylene, or similar materials. The pickup truck bed 110 includes outer sidewalls 112 which merge smoothly with opposed generally parallel inner sidewalls 114. The inner sidewalls 114 are interrupted by opposed, spaced apart wheel wells 116 which are suitably sized and located to accommodate the respective rear tire and wheel assemblies 118 of a pickup truck 120 or similar light to medium duty cargo vehicle. The opposed inner sidewalls 114 merge with a transversely extending front wall 122 which may define a single panel interconnecting and merging with the inner opposed sidewalls 114 or a double wall panel having inner and outer panels which interconnect and merge with respective ones of the inner sidewalls 114 and the outer sidewalls 112. The pair of inner sidewalls 114 and the transverse front wall 122 all merge with and are interconnected by a floor or bottom panel 124.

To improve the strength and rigidity of the floor or bottom panel 124, it preferably defines a plurality of corrugations 126 which extend longitudinally substantially its full length. A plurality of fasteners such as carriage bolts 128 or other mechanical fastening devices extend through the bottom panel 124 and secure the pickup truck bed 110 to a plurality of transverse braces or members 130 which are, in turn, secured to a frame or undercarriage 132 of the pickup truck 110. A tailgate assembly 136 is pivotally disposed across the open end of the pickup truck bed 110. Preferably and typically, the non-metallic pickup truck bed 110 also includes backup and taillight assemblies 138 which function in accordance with conventional practice. The pickup truck 120 also includes a conventional cab 140 as well as front tire and wheel assemblies 142.

Referring now to FIG. 7, a portion of the plurality of corrugations 126 of the bottom panel 124 are illustrated in enlarged cross-section. In FIG. 7, the bottom panel 124 which includes two layers of distinct materials which have been co-formed by extrusion into continuous sheets, cut and then formed into the desired shape and configuration according to the methods described above, includes a first or upper layer 152 which has a roughened surface 154 prepared according to the process described above. The bottom panel 124 also includes a second or lower layer 156 which may be referred to as the substrate and generally may be the more rugged material which supports the upper layer 152.

Figure 8:
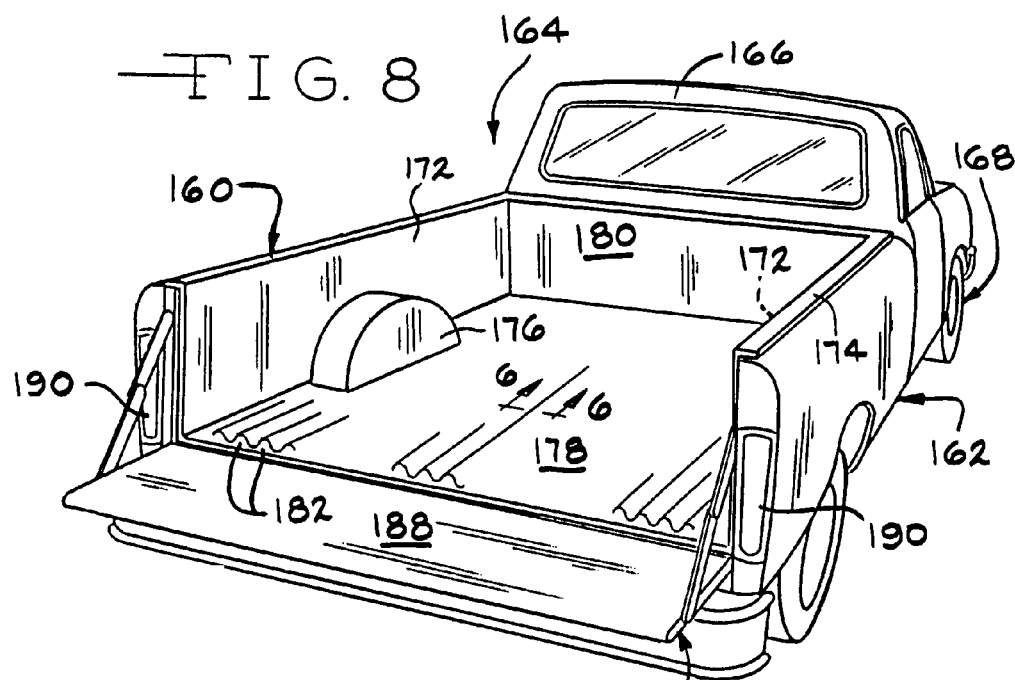
FIG. 8 is a perspective view of a pickup truck and conventional metal box or bed having a composite bed liner according to the present invention.
Figure 9:
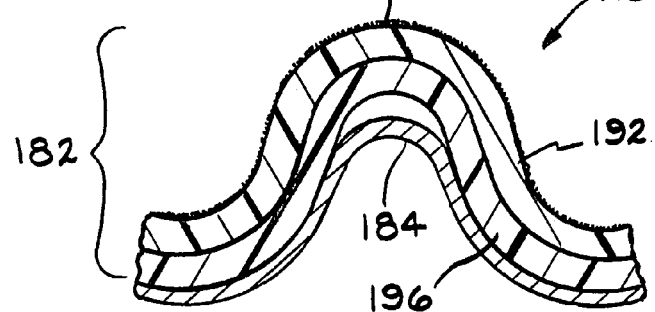
FIG. 9 is a greatly enlarged, fragmentary, sectional view of a bed liner taken along line 9—9 of FIG. 8.

Referring now to FIGS. 8 and 9, a pickup truck bed liner is illustrated and generally designated by the reference number 160. The pickup truck bed liner 160 is utilized in a conventional metal box or bed 162 of a pickup truck 164 having a cab 166 and front tire and wheel assemblies 168. The bed liner 160 is a unitary structure molded from a single or two layer panel or sheet of thermoplastic material as set forth above. The bed liner 160 includes sidewalls 172 which may include an upper rail 174 and a pair of opposed wheel wells 176 which extend between the sidewalls 172 and a floor or bottom panel 178. The bed liner 160 disclosed herein is the style referred to as an "over the rail" bed liner. It should be appreciated that the present invention is equally suitable and usable with "under the rail" bed liners which are similar in most respects to the bed liner 160 disclosed herein except that they lack the upper rail 174. The floor or bottom panel 178 merges with both the sidewalls 172 and a front wall 180. The floor or bottom panel 178 preferably includes corrugations 182 complementary to the corrugations 184 of the pickup truck bed 162. A tailgate assembly 186 may include a protective cover 188 fabricated of materials similar to that from which the bed liner 160 is fabricated. The pickup truck 164 also preferably includes conventional taillight and backup light assemblies 190.

Referring now to FIG. 9, a portion of the bottom panel 178 of the pickup truck bed liner 160 illustrating the corrugations 182 which, as noted, are complementary to the corrugations 184 of the pickup truck bed, is illustrated in cross-section. In FIG. 9, an upper layer 192 includes a roughened or textured surface 194 according to the present invention and a lower or substrate portion 196.

The foregoing disclosure is the best mode devised by the inventors for practicing this invention. It is apparent, however, that apparatus, products and methods incorporating modifications and variations will be obvious to one skilled in the art of truck beds, bed liners and manufacturing apparatus and processes therefor. Inasmuch as the foregoing disclosure presents the best mode contemplated by the inventors for carrying out the invention and is intended to enable any person skilled in the pertinent art to practice this invention, it should not be construed to be limited thereby but should be construed to include such aforementioned obvious variations and be limited only by the spirit and scope of the following claims.

The invention claimed is:

1. A cargo carrier for a motor vehicle comprising:
   a sheet having at least one layer of a thermoplastic material, wherein the sheet is formed so as to define a pair of opposed, spaced apart sidewalls, a front wall extending between and merging with the sidewalls, a bottom panel extending between and merging with the sidewalls and the front wall having an upper surface, and a pair of wheel well features disposed generally between the bottom panel and a respective one of the pair of sidewalls,
   wherein at least a portion of the upper surface is a roughened, friction enhancing surface having; irregular, aligned, elongate grooves abraded therein.

2. The cargo carrier according to claim 1, wherein the sheet comprises a first layer of a first thermoplastic material and a second layer of a second thermoplastic material co-formed together as a composite sheet.

3. The cargo carrier according to claim 2, wherein the composite sheet is co-extruded.

4. The cargo carrier according to claim 2, wherein the upper surface comprises the first layer of the first thermoplastic material and the first thermoplastic material is selected from the group consisting of linear low density polyethylene and polyolefin.

5. The cargo carrier according to claim 2, wherein the first and second layers are bonded together without an adhesive.

6. The cargo carrier according to claim 2, wherein the second layer is a lower layer of high density polyethylene.

7. The cargo carrier according to claim 1, wherein the sheet comprises high density polyethylene.

8. The cargo carrier according to claim 1, wherein the roughened, friction enhancing surface is achieved by a rotary brush.

9. The cargo carrier according to claim 1, wherein the depressions are elongated in structure.

* * * * *